OR 3,870,394

United States

Ploeckl

[11] 3,870,394

[45] Mar. 11, 1975

[54] OPTICAL SCANNER MECHANISM

[75] Inventor: Johann Ploeckl, Unterhaching, Germany

[73] Assignee: Zellweger AG, Uster, Switzerland

[22] Filed: July 20, 1973

[21] Appl. No.: 381,364

[30] Foreign Application Priority Data

Aug. 10, 1972 Switzerland ........................ 11881/72

[52] U.S. Cl. ........................ 350/7, 350/191, 350/199

[51] Int. Cl. ........................ G02b 17/00

[58] Field of Search ........... 350/6, 7, 285, 199, 191, 350/189, 200

[56] References Cited

UNITED STATES PATENTS

| | | | |
|---|---|---|---|
| 3,508,068 | 4/1970 | Harris et al. | 350/6 |
| 3,520,586 | 7/1970 | Bousky | 350/6 |

*Primary Examiner*—Ronald L. Wibert
*Assistant Examiner*—Michael J. Tokar
*Attorney, Agent, or Firm*—Werner W. Kleeman

[57] ABSTRACT

An optical scanner mechanism, especially for optically discernible characters associated with or applied to articles, for scanning each article by means of a bundle of scanning light rays which in accordance with the rotational- or oscillating movement of a part of a beam deflection mechanism for further transmitting the bundle of light rays scans a surface or plane determined by guide means. A bundle of light rays emanating from a light source is directed by optical means against a reflecting surface of the beam deflecting mechanism. The bundle of scanning light rays reflected by this reflecting surface is transmitted towards a concave mirror or reflector by means of a torus-shaped meniscus lens arranged intermediate the beam deflecting mechanism and the concave mirror. The bundle of scanning light rays or beam reflected by the concave mirror is focused by the latter in a plane determined by the guide means.

12 Claims, 3 Drawing Figures

PATENTED MAR 11 1975 3,870,394

SHEET 1 OF 3

OPTICAL SCANNER MECHANISM

BACKGROUND OF THE INVENTION

The present invention relates to a new and improved construction of optical scanner mechanism, especially an optical scanner for optically discernible characters associated with articles, preferably applied thereto. The term "article," whether used in the singular or plural, as employed herein is used in its broader sense to encompass different types of goods, wares, products or the like, which can have information in the form of characters or the like applied directly or indirectly thereto.

These characters can constitute information associated with the relevant articles, such characters preferably appearing in coded form. For the purpose of reading-out each such character a scanning light beam or bundle of light rays is guided over the character and depending upon the reflection capability of the location of the character momentarily impinged by such scanning light beam, a part of the thus transmitted light beam is reflected. A received bundle of light formed from at least part of the reflected light is delivered to an electro-optical receiver which transforms the received light beam into an electrical signal. This electrical signal can be delivered in conventional manner to a suitable processing device, typically a computer and evaluated. The evaluation result can concern, for instance, the price of the articles, the introduction of the price of the article into a calculating installation, the determination of the scale of different articles, the article numbers of which are coded in character form, and generally can serve for controlling the warehouse or storage supply, just to mention a few notable possibilities.

In prior art scanners the scanning light beam is generated with the aid of a beam deflection device which, for instance, encompasses a rotatable- or oscillating component. Such rotatable component can be, for instance, a polygon mirror or reflector, while as the oscillating component of the mirror there can be employed a mirror galvanometer system. These known beam deflection devices do not function in an error-free manner. For instance, notwithstanding constant rotational speed or oscillating frequency there occur non-parallel scanning traces, or the scanning traces of successive scanning operations possess an irregular spacing from one another or even a false sequence. Such deviations are particularly attributable to the so-called pyramid errors of the mechanical rotational- or oscillating component. In this regard there is to be understood even when employing polygonal mirrors or reflectors fabricated with the greatest precision nonetheless there occur non-parallelism of the reflecting surfaces of the polygonal mirror with respect to its rotational axis, and in the case of an oscillating component there occur oscillating movements of the mechanical oscillating component about one or more axes which differ from the main oscillation axis of the system, and which phenomena cannot be avoided. The pyramid errors cause the light spot, produced from the scanning light beam scanning the character, to deviate from its reference scanning trace, and such can lead to errors during reading of the character.

SUMMARY OF THE INVENTION

Hence, it is a primary object of the present invention to provide an improved construction of optical scanner mechanism which is not associated with the aforementioned drawbacks and limitations of the prior art constructions.

Another and more specific object of the present invention is directed to the provision of a new and improved construction of scanner mechanism of the previously mentioned type in which the aforementioned pyramid errors can be extensively overcome through the use of optical means.

Yet a further significant object of this invention aims at the provision of an otpical scanner which is relatively simple in construction and design, extremely reliable in operation, and provides for accurate scanning of a character to be read.

Now in order to implement these and still further objects of the invention, which will become more readily apparent as the description proceeds, the invention contemplates an optical scanner mechanism, especially for optically discernible characters which are associated with or applied to articles, the scanning occurring by means of a bundle of scanning light rays which, as a function of the rotational- or oscillating movement about an axis of a part of a beam deflecting mechanism which further transmits the bundle of light rays, scans a region, such as a surface or plane, determined by guide means. The scanner or scanning mechanism of the invention is manifested by the features that a bundle of light rays emanating from a light source is directed by optical means against a reflecting surface of the beam deflection mechanism, and that the bundle of scanning light rays reflected by such reflecting surface are directed against a concave mirror by means of a torus meniscus lens which is arranged between the beam deflecting mechanism and the concave mirror. The bundle of scanning light rays reflected by the concave mirror is focused substantially in a plane determined by the guide means.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
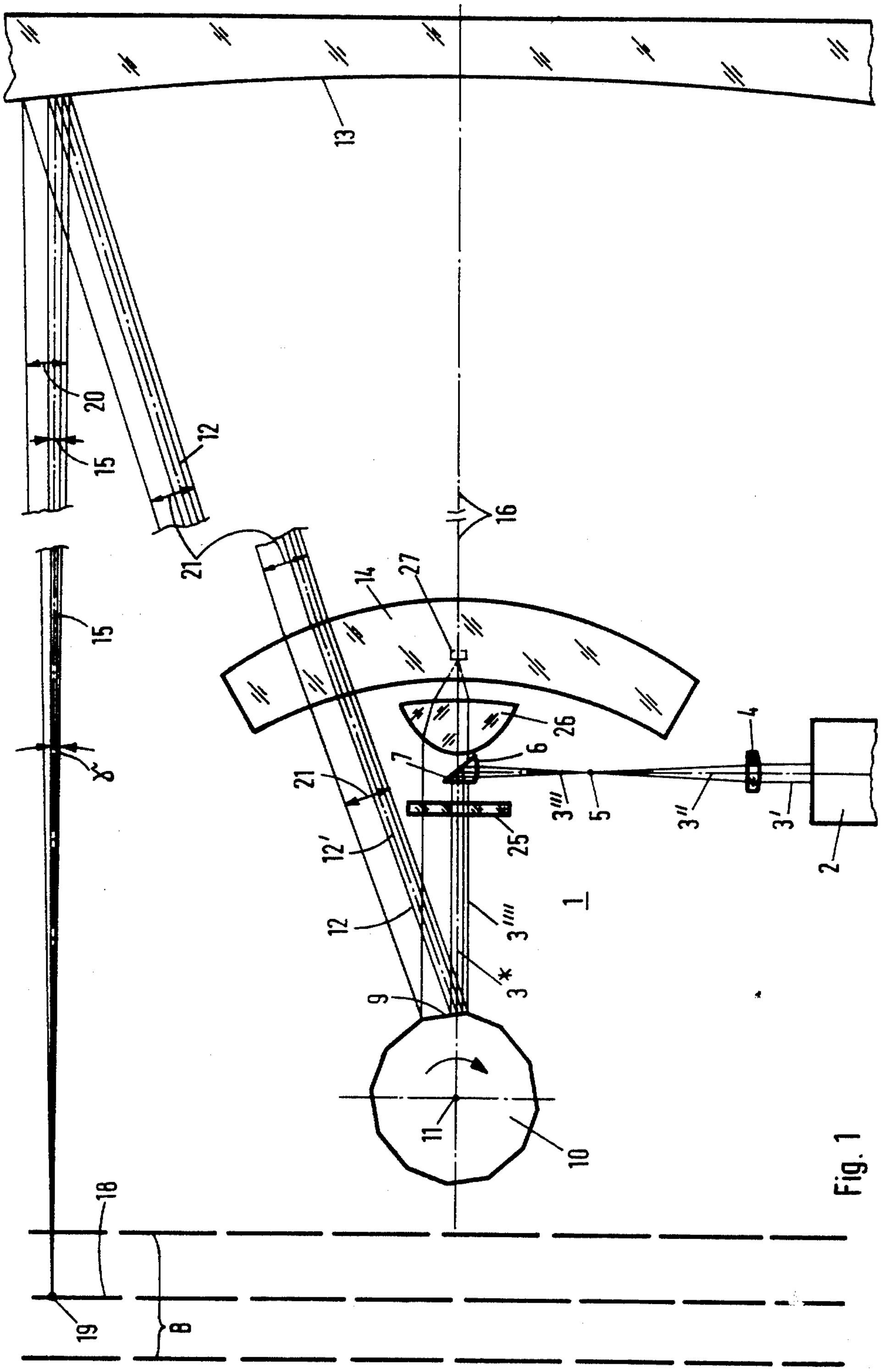
FIG. 1 is a plan view of an exemplary embodiment of an optical system of a scanner mechanism depicting therein the path of the light rays or beam.

Reference will now be made to the accompanying drawings wherein corresponding components have been designated throughout by the same reference characters, the drawings depicting details of the scanner mechanism designed according to the teachings of the present invention. As previously explained the scanner can be employed in reading apparatus for the reading of optically discernible characters, typically presented in coded form, and for instance of the type disclosed in the commonly assigned, U.S. applications, Ser. No. 221,706, filed Jan. 28, 1972, now U.S. Pat. No. 3,758,783, and entitled: "Reader Mechanism for Optically Discernible Characters" and Ser. No. 221,702, filed Jan. 28, 1972, now U.S. Pat. No. 3,752,999 and entitled "Reading Apparatus For Optically Discernible Characters," to which reference may be readily had and the description of which is incorporated herein by reference for general background information.

Figure 2:
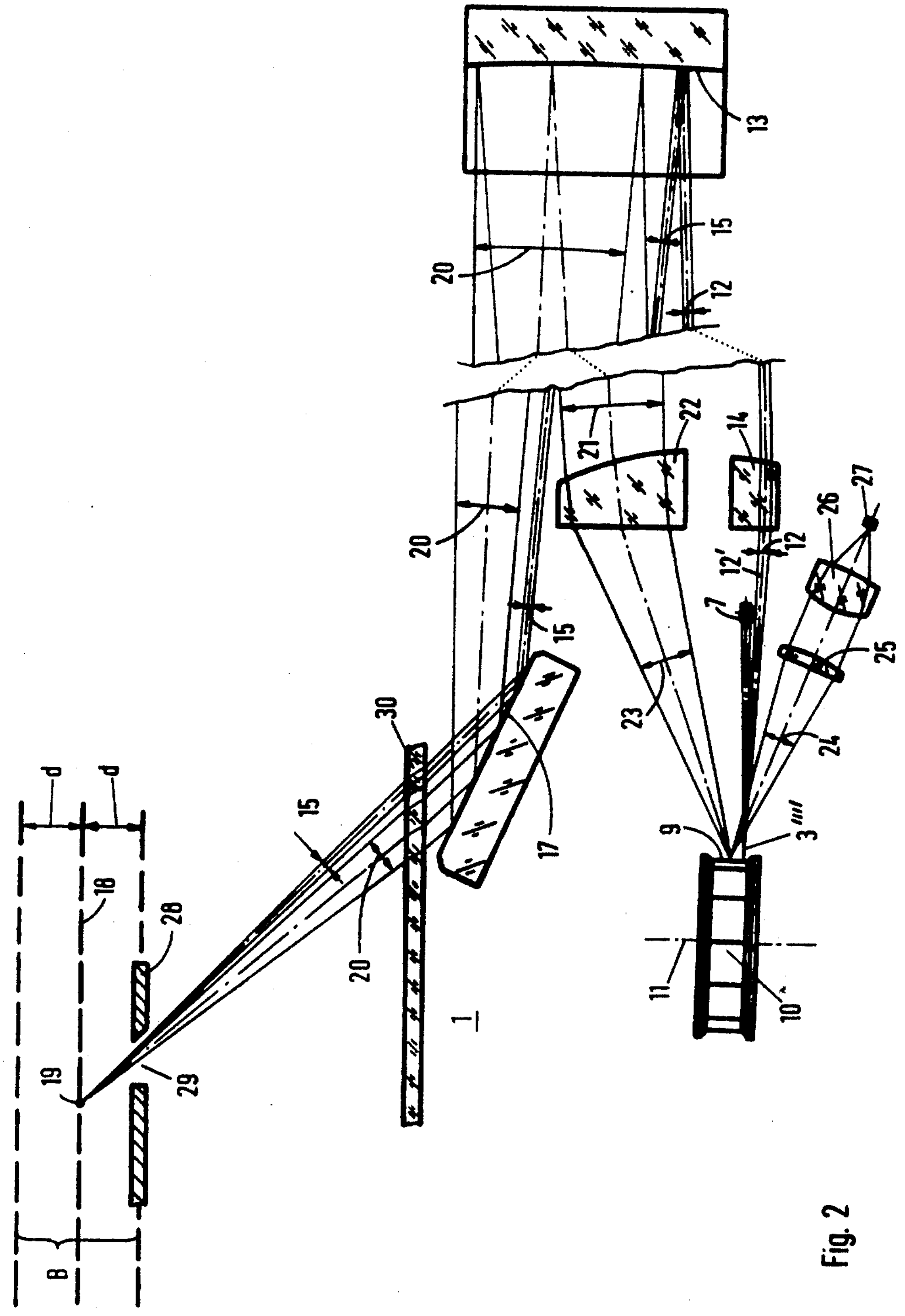
FIG. 2 is an elevational view of the optical system depicted in FIG. 1 and also illustrating the light rays.

Turning now to FIG. 1 there is depicted therein an exemplary embodiment of an optical system of a scanning or scanner mechanism showing the path of the rays in plan view. For purposes of clarity in illustration individual ray paths have been depicted with broken lines. FIG. 2 illustrates an elevational view of the arrangement of FIG. 1. The scanner mechanism 1 will be understood to comprise a light source 2, preferably a laser light source, the emerging light rays or light beam of which is directed against a cylindrical lens member 4 in the form of an essentially parallel bundle of light rays or beam 3'. The axis of the cylindrical lens member 4 is disposed perpendicular to the plane of the drawing of FIG. 1. A converging bundle of light rays or light beam 3'' emanating from the cylindrical lens member 4, and with such light beam essentially possessing an elongate rectangular cross-section, is focused at location 5 into a thin line which is perpendicular to the plane of the drawing. This light beam is then directed in the form of a diverging light beam or bundle of light rays 3''' against a spherical inlet surface 6 of a totally reflecting prism 7. This prism or prism member 7 deflects the incident bundle of light rays 3''' at right angles and directs an approximately parallel bundle of light rays 3''' against a reflecting surface 9 of a polygonal mirror or reflector 10 rotating about an axis 11. The spherical surface 6 is designed such that the diverging bundle of light rays 3''' again becomes approximately parallel in the plane of illustration of FIG. 1 but thicker than the bundle of light rays 3'.

Furthermore, the spacing of the prism 7 from the polygonal mirror or reflector 10 is chosen such that the light beam or bundle of light rays 3'''' emanating from the prism 7 is focused into a thin or narrow line at the reflecting or mirror surface 9 of the polygonal mirror 10, as readily seen by referring to FIGS. 1 and 2.

The optical elements, namely the cylindrical lens 4 and the prism 7 arranged between the light source 2 and the reflecting surface 9 of the polygonal mirror 10, will be referred to hereinafter collectively as the "first optical means."

The polygonal mirror or reflector 10 defining a beam deflection mechanism rotates about its axis 11 which is disposed perpendicular to the plane of the drawing of FIG. 1. In this way the polygonal reflector 10 produces a bundle of scanning light rays or scanning light beam 12 which pivots with twice the angular velocity of the polygonal reflector 10. The pivotal or angularly shifting scanning light beam 12 now passes a first substantially torus-shaped meniscus lens 14 arranged between the polygonal reflector 10 and a concave mirror 13, the meniscus lens being situated preferably closer to the polygonal reflector 10. At this point it is mentioned that in the context of this disclosure and as applied to the relevant lenses discussed herein the term "torus-shaped" is intended to encompass a segment of a torus configuration and the term "cylindrical-shaped or cylindrical" is intended to encompass a part or segment of a cylinder. At an intersection plane which is perpendicular to the plane of the drawing of FIG. 1 and extending through the main beam 12' of the bundle of light rays 12' the light beam 12 is approximately parallel. This light beam 12 impinges upon the concave mirror 13 and is focused by the latter in the form of a converging scanning light beam or bundle of light rays 15, if desired through the agency of a deflecting mirror or reflector 17 arranged perpendicular to the main symmetry plane 16 of the optical system 1, into a sharp scanning light spot 19 at a scanning plane 18 disposed perpendicular to the plane of the drawing of FIG. 1. The optical elements arranged between the reflecting surface 9 of the polygonal mirror 10 functioning as the beam deflection mechanism and the scanning plane 18, namely the first torus-shaped meniscus lens 14, the concave mirror 13 and the possibly provided deflecting mirror 17 are collectively referred to hereinafter as the "second optical means."

The focal point of the concave mirror 17 is preferably located at least approximately at the axis 11 of the beam deflecting mechanism i.e., the polygonal mirror 10. The optical arrangement chosen according to the previously discussed considerations for the formation of the scanning light beam 15 produces a very small convergence angle $\gamma$ of such scanning light ray beam 15. In this way there is achieved the result that the cross-section of the scanning light ray beam 15, producing the scanning spot 19 at a character to be read, is still sufficiently small in comparison to the structure of the character to be scanned within a predetermined sufficiently large region in front of and behind the scanning plane 18, and thus the character to be scanned need only lie within this scanning region and not exactly in the scanning plane 18.

A received light beam or bundle of light rays 20 emanating from the scanning light spot 19 at a scanned character is reflected back through the agency of the concave mirror 13 in the form of an approximately parallel bundle of light rays 21 and via a second torus-shaped meniscus lens 22 (*cf* FIG. 2) arranged for instance above the first torus-shaped meniscus lens 14, to the reflecting surface 9 of the polygonal mirror or reflector 10. The converging beam of light rays 23 which is directed by the second torus-shaped meniscus lens 22 against the reflecting surface 9 is focused by the second torus-shaped meniscus lens 22 at such reflecting surface 9.

The arrangement of both torus-shaped meniscus lenses 14 and 22 is preferably chosen such that the reflection locations of the bundle of light rays 3'''', which ultimately produces the beam of scanning light rays 15, and the converging beam of light rays 23 emanating from the received light ray beam 20 (see FIG. 2) at the reflecting surface 9 are spatially offset or positionally shifted with respect to one another. In this way there is avoided that, owing to optical imperfections or defects, such as scratches, dust and the like at the reflecting surface 9, stray light will be transferred to the bundle of received light rays from the bundle of scanning light rays 3'''' which possesses a much more intensive light current. Such stray light transfer would disadvantageously influence the signal-noise ratio at the photoelectric receiver impinged by the received bundle of light rays, as has been explained in detail in my copending, commonly assigned U.S. application, Ser. No.

381,282 filed July 20, 1973, entitled "Optical Scanner".

As also best seen by referring to FIG. 2, in similar manner it is advantageous to spatially offset with respect to one another the reflection locations of the light beams 12 and 20 at the concave mirror 13.

The light beam 23 which impinges from above at an inclination at the reflecting surface 9 is reflected in the form of a diverging light beam 24 which extends downwardly at an inclination, as shown in FIG. 2. The light beam or bundle of light rays 24 is transmitted through a third optical means, such as for instance a cylindrical lens 25 and lens 26, against the active surface of a photo-electric receiver 27, for instance a photodiode.

The scanning plane 18 is located for instance at a spacing $d$ (see FIG. 2) above a cover plate 28 serving as a guide means. This cover plate 28 possesses a slot 29 through which passes both the scanning light beam 15 as well as also the received light beam 20. The described arrangement produces a small light spot 19 which is satisfactory for the scanning operation at a region B (also referred to as scanning region or depth of focus region) of the thickness or width $2d$ which is spatially located to both sides of the scanning plane 18.

Figure 3:
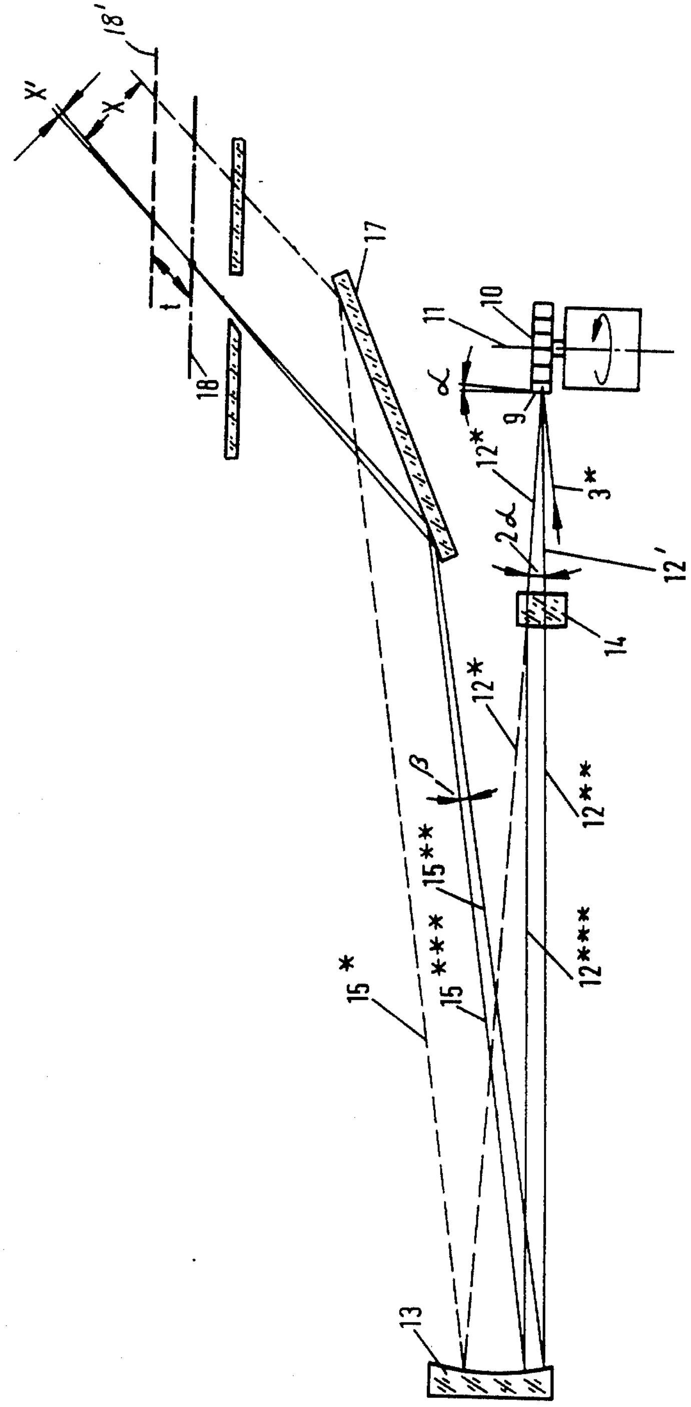
FIG. 3 schematically illustrates a portion of the optical scanner mechanism of the invention and specifically depicting the course of the main beam of the bundle of scanning light rays under the effects of the pyramid errors.

FIG. 3 schematically illustrates the course of the main or primary beam of the bundle of scanning light rays (*cf.* FIGS. 1 and 2) under the effects of the pyramid error. Owing to unavoidable fabrication tolerances the individual polygon surfaces 9 of the polygon mirror or reflector 10 are inclined or canted through the angle $\alpha$ with respect to its rotational axis 11. Consequently, a main beam 3* which impinges upon such canted polygon surface, after its reflection in the form of a primary or main beam 12*, possesses a pyramid error of $2\alpha$ with respect to its reference position 12'. Consequently, without any further measures the scanning light beam 15* (main beam) reflected from the concave mirror 13 towards the scanning surface 18 will be offset by the amount $\pm X = f_H' \cdot \tan 2\alpha$ with respect to the reference position (15) of this main beam, wherein $f_H'$ represents the focal length of the concave mirror 13. The torus-shaped meniscus lens 14 which is arranged between the polygonal mirror 10 and the concave mirror 13, preferably closer to the polygonal mirror 10 than the concave mirror 13, is now suitably constructed and arranged so that the main beams 12' and 12* in front of the torus-shaped meniscus lens 14 and inclined with respect to one another by the angle $2\alpha$ after departing from the torus-shaped meniscus lens 14, will impinge at the concave mirror 13 in the form of the parallelly extending beams 12** and 12***. In other words, the meridian focal point of the torus-shaped meniscus lens 14 is located at the reflecting surface 9 of the polygon reflector or mirror 10. From the location of the concave mirror 13 the scanning light beam 15*** now will be focused at the angle $\beta$ with respect to the reference direction 15** (if desired via the deflecting mirror 17) in the scanning plane 18 at the convergence point or light spot 19. In a parallel plane 18' to the ideal scanning plane 18** there is then produced, by virtue of the aforementioned measures, a line displacement $x'$ which amounts to:

$$x' = t \cdot \tan \beta \text{ or } x = t \cdot \tan (f_t'/f_H' \cdot 2\alpha)$$

since $\beta = f_t'/f_H' \cdot 2\alpha$, and wherein $f_t'$ = the focal length of the torus-shaped meniscus lens 14.

Consequently, there are now realized the following advantages: in the scanning plane 18 the line shifting or displacement caused by the pyramid error amounts to null, i.e., is completely corrected. In the parallel plane 18' located at a spacing $t$ behind or in front of the ideal scanning plane 18 and measured in the direction of the beam, there occurs a considerably smaller line displacement caused by the pyramid errors than would be present without the aforementioned measures.

For instance, for the value $t = 15$ mm, $f_H' = 350$ mm and $f_t' = 70$ mm, the line displacement $x'$ is about seventy times smaller than the line displacement $x$ which would be present without the torus-shaped meniscus lens 14.

The bending or depth of curvature of the torus-shaped meniscus lens 14 is to be chosen at least approximately such that the image dimension, in other words the ratio of the intercept length at the side of the object to that at the side of the image is constant. The intercept length is to be considered as the distance between the lens and the image or object respectively.

From the equation for $x'$ and $\beta$ it will be apparent that it is advantageous to choose $f_t'$ as small as possible and $f_H'$ as large as possible. This can be achieved to a particularly great extent with an arrangement in which the meniscus lens 14 is located as closely as possible to the polygonal mirror 10 and with as large as possible focal length $f_H'$ of the concave mirror 13, and as taught by the present invention.

A further advantage of the torus-shaped meniscus lens 14 resides in the fact that owing to the displacement of the beam with oblique throughpassage thereof, it is possible to at least partially correct scanning speed errors, as such might occur with large beam deflection.

The optical system of the beam deflection-mechanism can be protected against dust by a plane-parallel glass plate 13 arranged at the region of the slot 29.

While there is shown and described present preferred embodiments of the invention, it is to be distinctly understood that the invention is not limited thereto, but may be otherwise variously embodied and practiced within the scope of the following claims. Accordingly,

What is claimed is:

1. An optical scanner mechanism, especially for optically discernible characters associated with or applied to articles, comprising a light source for generating a scanning light beam, guide means for determining a scanning region, a beam deflection mechanism including a movable component having a central axis and serving for transmitting the scanning light beam to said scanning region determined by said guide means, said movable component of said beam deflection mechanism incorporating reflecting surface means, optical means for directing the bundle of light rays emanating from the light source against the reflecting surface means of said beam deflection mechanism, a concave mirror, a substantially torus-shaped meniscus lens arranged between said beam deflection mechanism and said concave mirror for reducing the effects of possible non-parallelism of said reflecting surface means of the movable component with respect to its central axis, the scanning light beam which is reflected by the reflecting surface means of said beam deflection mechanism being directed by said torus-shaped meniscus lens member against the concave mirror, said concave mirror focusing said scanning light beam reflected by the concave mirror at said scanning region determined by the guide means.

2. The optical scanner mechanism as defined in claim 1, wherein the scanning region determined by the guide means comprises a scanning plane.

3. The optical scanner mechanism as defined in claim 1, wherein the scanning region determined by the guide means defines a scanning surface.

4. The optical scanner as defined in claim 1, wherein said optical means embodies first optical means by means of which the bundle of light rays emanating from the light source is deflected against the movable reflecting surface means, said first optical means incorporating a prism provided with a substantially spherical inlet surface.

5. The optical scanner mechanism as defined in claim 1, wherein the spacing of the torus-shaped meniscus lens from the beam deflection mechanism is smaller than the spacing of such meniscus lens from the concave mirror.

6. The optical scanner mechanism as defined in claim 1, wherein the torus-shaped meniscus lens is constructed and arranged such that the bundle of light rays impinging therefrom upon the reflecting surface impinges such surface means at a first location which is spatially offset with respect to a second location of such reflecting surface means at which there impinges a received bundle of light rays at the reflecting surface means.

7. The optical scanner mechanism as defined in claim 1, wherein the torus-shaped meniscus lens images the scanning light beam at a first location of the concave mirror, said first location being positionally offset with respect to a second location of the concave mirror at which there is reflected a received bundle of light rays.

8. The optical scanner mechanism as defined in claim 1, further including a second torus-shaped meniscus lens, and wherein a received bundle of light rays emanating from a scanning spot derived from the scanning light beam is imaged via the concave mirror and the second torus-shaped meniscus lens at said reflecting surface means.

9. The optical scanner mechanism as defined in claim 1, including further optical means and a photoelectric receiver, and wherein a bundle of received light rays after its reflection at the reflecting surface means is imaged by said further optical means at said photoelectric receiver.

10. The optical scanner mechanism as defined in claim 1, wherein the focal point of the concave mirror is located at least approximately at the axis of the beam deflecting mechanism.

11. The optical scanner mechanism as defined in claim 1, wherein the focal length of the torus-shaped meniscus lens is smaller than the focal length of the concave mirror.

12. The optical scanner mechanism as defined in claim 1, wherein the meridian focal point of the torus-shaped meniscus lens is located at the surface of the beam deflection mechanism.

* * * * *